United States Patent [19]

Bartel et al.

[11] Patent Number: 5,278,507
[45] Date of Patent: Jan. 11, 1994

[54] WELL LOGGING METHOD AND APPARATUS PROVIDING MULTIPLE DEPTH OF INVESTIGATION USING MULTIPLE TRANSMITTERS AND SINGLE RECEIVER PAIR HAVING DEPTH OF INVESTIGATION INDEPENDENT OF FORMATION RESISTIVITY

[75] Inventors: Roger P. Bartel; M. Vikram Rao, both of Houston; Paul F. Rodney, Spring, all of Tex.

[73] Assignee: Baroid Technology, Inc., Houston, Tex.

[21] Appl. No.: 715,401

[22] Filed: Jun. 14, 1991

[51] Int. Cl.$^5$ .............................................. G01V 3/30
[52] U.S. Cl. ...................................... 324/338; 324/335
[58] Field of Search ................................ 324/335–343

[56] References Cited

U.S. PATENT DOCUMENTS

| 4,451,789 | 5/1984 | Meador | 324/338 |
| 4,609,873 | 9/1986 | Cox et al. | 324/338 |
| 4,810,970 | 3/1989 | Warren et al. | 324/338 |

Primary Examiner—Walter E. Snow
Attorney, Agent, or Firm—Browning, Bushman, Anderson & Brookhart

[57] ABSTRACT

An apparatus and method for determining formation resistivity at a plurality of radial distances from an earth borehole uses a single receiver pair and a plurality of electromagnetic energy transmitters sequentially spaced along the apparatus from the receiver pair, such transmitters being sequentially pulsed at approximately 1-2 MHz each to provide time separation between the pulsing of the plurality of transmitters. The closest spaced transmitter is spaced a predetermined distance from the closer receiver to make the depth of investigation of the closest transmitter essentially independent of formation resistivity. Alternatively, a single transmitter is spaced a predetermined distance from the closer receiver to make the depth of investigation of such transmitter essentially independent of formation resistivity.

8 Claims, 3 Drawing Sheets

WELL LOGGING METHOD AND APPARATUS PROVIDING MULTIPLE DEPTH OF INVESTIGATION USING MULTIPLE TRANSMITTERS AND SINGLE RECEIVER PAIR HAVING DEPTH OF INVESTIGATION INDEPENDENT OF FORMATION RESISTIVITY

BACKGROUND OF THE INVENTION

1. Field of the Invention

The present invention relates generally to a method and apparatus for measuring formation parameters by transmitting and receiving electromagnetic signals within a logging instrument in an earth borehole. More particularly, the present invention is related to downhole logging tools which use electromagnetic energy to perform measurements of formation or borehole parameters.

2. Description of the Background

It is desirable for many reasons to transmit electrical signals through the earth as a medium, and to receive the signals at a location spaced from the transmitter. Such a signal system is, for example, used both for the determination of various parameters associated with the medium and for communication purposes. These systems are often used in the investigation of the environment surrounding a borehole, and in particular, the surrounding formations. Various types of borehole logging systems are available to perform these investigations. A class of these systems utilizes electromagnetic field phenomena to obtain data from the environments surrounding the borehole. One type of prior art logging is electrode logging which utilizes an electric field in the surrounding formation to produce a measure of the conductivity of the formation. A conductive mud is necessary for proper use of this system, thus rendering the system inoperative with oil based muds. Inductive logging is another type of prior art electromagnetic logging which uses a time-varying magnetic field in the formation to produce a secondary current flow in the formation. The secondary current flow sets up a second magnetic field which induces current in receiving coils positioned in the borehole, the induced current in the receiving coil or coils being proportional to the secondary current flow in the formation and thus is directly proportional to the conductivity or inversely proportional to the resistivity of the surrounding formation. Using electromagnetic energy for investigating the environment around a borehole is the subject of the present invention.

In the art of well logging, it is well known that it is desirable to be able to measure the parameter of interest, for example, formation resistivity, at different radial distances from the borehole. This is commonly referred to as making measurements at different depths of investigation.

For example, in U.S. Pat. No. 3,453,530 to G. Attali, there is a general discussion of induction logging and of the need for multiple depth investigation measurements, at least as far as they pertain to wireline logs. In providing such a showing, there is a disclosure of producing simultaneous resistivity measurement of three radially different formation zones. Also, the patent recites that when relatively thin formations are encountered, more than one type of formation may enter into the measurement being made at any given moment and that this same problem is encountered at the boundary between two different formations. From this disclosure, those skilled in the art will recognize that it is highly desirable that all measurements be made with as fine a bed resolution as possible and that the bed resolution of all the sensors be closely matched. It is also clear that the Attali system shows the use of the same transmitters for different receiver systems.

In U.S. Pat. No. 3,893,020 to R. A. Meador and L. Thompson, there is a teaching of the use of two transmitters at different frequencies with a single receiver but which works with frequencies considerably higher, perhaps an order of magnitude, than those used in accordance with the present invention. Moreover, in the disclosure of Meador and Thompson, the signals from the two transmitters are received at the receiver coil simultaneously. In their preferred embodiment, Meador and Thompson use different frequencies and different transmitter spacings to concentrate the electromagnetic field at the same depth in the formation in order to calculate the dielectric constant and conductivity of a portion of the formation. Measurements at two frequencies but at the same depth in the formation are necessary since in the disclosure of Meador and Thompson, all measurements are based solely on the received amplitude of the signal.

U.S. Pat. No. 4,319,192 to R. Chemali and J. Tabanou, as well as U.S. Pat. No. 4,107,597 to Meador et al; U.S. Pat. No. 3,551,797 to Gouilloud et al; and U.S. Pat. No. 4,209,747 to Hutchital, are typical of many patents, some with multiple frequencies, that show the use of multiple transmitters with multiple receiver pairs to obtain multiple depths of investigation.

U.S. Pat. No. 4,651,101 to T. D. Barber, R. N. Chandler, and J. F. Hunka relates to the use of a system which, while claiming to be an improvement in electromagnetic wave propagation logging, relates to what the patentees claim to be a "quasi-static electromagnetic field". This patent indicates, in error, that only when the preferred frequencies of between about 10 and 400 KHz and not above 400 KHz are used, displacement currents are insignificant. When displacement currents are significant, the output signal is responsive not only to a conductivity of the formation but also to its dielectric constant, which would be undesirable for the purposes of the present invention. They indicate further a preference that the upper limits of the frequency range be about 200 KHz and that a preferred lower limit of the frequency range would be about 20 KHz.

In U.S. Pat. No. 4,551,789 to Meador, there is a suggestion of the desirability of making a plurality of radially different measurements at a single vertical depth, but no disclosure of how to accomplish this goal.

U.S. Pat. No. 4,818,946 to T. D. Barber uses a particular antenna array and digital processing techniques in an attempt to enhance the resolution of an induction logging tool. Barber states that resolutions of the multidepth sensors in a conventional logging suite differ, the deep reading sensors having a poorer resolution than the shallow reading sensors. Barber's method requires at least one transmitter and at least two receivers.

U.S. Pat. No. 4,837,517 to T. D. Barber shows the use of one or more transmitters with two or more receivers.

U.S. Pat. No. 4,873,488 to T. D. Barber, R. N. Chandler, and J. F. Hunka is another example of a system using at least one transmitter with at least two receiver arrays.

In U.S. Pat. No. 4,899,112 to B. Clark, J. Jundt, M. Luling, and M. O. Ross, there is described a system for determining formation resistivity at both shallow and deep depths of investigation, but which is dependent upon the long-recognized phenomena that measuring phase shift between a pair of receivers provides a different depth of investigation than measuring amplitude attenuation between that same pair of receivers, quite unlike the present invention in which different depths of investigation can be achieved by using either the amplitude attenuation or the phase shift alone to provide different depths of investigation. Moreover, although this reference shows a plurality of transmitters, they are equally-spaced from the receiver pair, on opposite sides of the receivers.

In the paper entitled "*Invasion Profile from the Digital Induction Log*" presented by P. A. S. Elkington and H. K. Patel at the SPWLA 26th Annual Logging Symposium on Jun. 17-20, 1985, there is a general discussion of the use of one transmitter and four receivers. The paper discusses the desirability of producing logs from different investigation depths with the same vertical response and resolution and presents evidence of having achieved that goal using a combination of digital processing and mutual inductance cancellation.

In the paper entitled "*Introduction to the High Resolution Induction Tool*" by R. Strickland, P. Sinclair, J. Harber, and J. DeBrecht, presented at the SPWLA 28th Annual Logging Symposium on Jun. 29-Jul. 2, 1987, there is a disclosure that "These prototypes are of entirely new mechanical construction in which every turn of every coil is positioned precisely along a mandrel made of highly temperature-stable materials. The position of each turn was calculated to precisely zero the mutual inductance with no extra adjustment". This language implies a plurality of receiving antennas, as is discussed in the prior art of the patents listed above where mutual inductance is discussed. There is an apparent inconsistency within the paper because a later statement recites that "All three measurements are made at the same point so that depth shifting errors are eliminated". The statement above with respect to mutual inductance is apparently incompatible with the statement that all three measurements are made at the same point since the use of multiple receivers implies that measurements cannot be made simultaneously at the same depth. It may be that the digital signal processing techniques used with this prior art high resolution induction sensor makes it possible, for all practical purposes, to claim that the measurements are made at the same depth but this is only an inference. By the manner in which the measurements are made, they cannot be made simultaneously at the same point. It should be clear that the paper does not directly state that the measurements are made simultaneously at the same point, but there can be no other reason to address this issue since most tools can make measurements at the same point, but at different times.

Another method uses multiple frequencies, as, e.g. in "*Resistivity profiling with a Multi Frequency Induction Sonde*", David F. Allen and Scott J. Jacobsen, presented at the SPWLA 28th Annual Logging Symposium, Jun. 29-Jul. 2, 1987. A variation on this theme is the use of a pulsed induction logging tool such as that produced by MPI, Inc., 4174 Technology Drive, Freemont, Calif. 94538. This sensor simultaneously transmits at a wide range of frequencies.

In the paper entitled "*Applications of the High Resolution Deep Investigation Resistivity Instrument*", presented by R. A. Khokhar, T. D. Lawrence, and W. H. Fertle at the SPWLA 12th French Section (SAID) Int. Formation Evaluation Symposium, Transaction Paper No. K, 1989, there is a discussion dealing with a lateral, pad contact type of device in which it is stated that a bed resolution of 0.5 inch can be obtained with their tool while a resistivity of beds 1.0 inch thick or better can be obtained. This is an example of the difference between resolution and full bed response with the use of two distinctly different tools to make the multiple depth measurements. The paper does clearly identify a need to provide measurements at multiple depths but with a common bed resolution which is as high as is practical.

In the paper entitled "*Field Test Results of the High Resolution Induction*", presented by M. W. Alberty and D. S. Epps, presented at the SPWLA 29th Annual Logging Symposium on Jun. 5-8, 1988, it is made quite clear that it is highly desirable to decouple the vertical and horizontal bed responses.

In yet another paper entitled "*Advances in High Resolution Logging*", published in the Technical Review, Volume 36, No. 2, pages 4-14, there is a discussion of the phasor induction tool. In particular, the paper shows that the high resolution of their sensor is obtained, not directly from the deep reading portion of the sensor, but from the shallow reading portion of the sensor. High resolution information thus obtained is used to synthetically improve the resolution of the deep reading portion of the sensor.

In the paper entitled "*Vertical Enhancement by Combination and Transformation of Associated Responses*", presented by P. A. S. Elkington, J. R. Samworth and M. C. Enstone at the SPWLA 31st Annual Logging Symposium on Jun. 24-27, 1990, there is discussion of there being a fairly sharp distinction between bed resolution and bed response. This distinction is in accord with the comments made above with respect to U.S. Pat. No. 4,818,946. In this paper, a general method of enhancing the vertical response of a wide class of sensors is discussed. The point of the paper is that there are often features visible in a log (resolved), but which are not presented on the log at anywhere near their true value (fully developed). It is thus clear that features are visible in a short spaced sensor which are not in a longer space sensor because, with the types of sensors considered, bed resolution decreases as the depth of investigation increases.

In the paper entitled "*Theory of Microinduction Measurements*" presented by W. C. Chew and R. L. Kleinberg in the IEEE Transactions on Geoscience and Remote Sensing, Vol. 26, No. 6, November 1988 at pages 707-719, there is the discussion of the use of an induction-type measurement made with a very shallow depth of investigation. This paper discloses that for the extremely small dimensions of the sensor, it is possible to make a crude approximation to the sensor response using geometrical factor theory, but that the response is best understood in terms of what the authors refer to as a "full wave" theory. The frequency of induction of the microinduction sensor is 25 MHz and the plane of the transmitting loop antenna is parallel to the borehole wall. In fact, although considerable space is devoted in the paper to the use of the geometric factor theory versus a "full wave" theory, the paper itself teaches away from the present invention. This is quite clear from a statement on page 708 of the paper, in the three paragraphs prior to Section II.

Finally, in U.S. Pat. No. 4,940,943 to R. P. Bartel and T. F. Rodney, assigned to the assignee of the present invention, there is a teaching of using a single transmitter with a pair of receivers in which the transmitter loop antenna is located in a first cutout within the conductive housing and the receiver antennas are located in additional cutouts in the conductive housing, such cutouts in the conductive housing being used to affect the patterns of the electromagnetic energy from the transmitter to the receivers.

In summary, the majority of the prior art, in attempting to measure formation resistivity at different depths of investigation, uses a plurality of transmitters with a plurality of differently-spaced receivers. In measurement-while-drilling (MWD) applications, in which the sensors are carried in the drill string, a plurality of differently-spaced receivers can cause severe problems due to the effect of "invasion", i.e., the time-dependent movement of borehole fluid into the formation. By way of example, if the hole is being drilled at a rate of penetration (ROP) of 5 ft/hour, and a couple of receiver pairs are spaced 2½ feet apart, the time elapsed between the measurements taken by a first pair ($R_1/R_2$) and the second pair ($R_3/R_4$) at the same vertical depth in the borehole is 30 minutes, during which time fluid in the formation can move a considerable distance and thus affect the resistivity measurement. Moreover, those prior references using a plurality of differently spaced transmitters with a single receiver pair, for example, U.S. Pat. No. 3,893,020 discussed above, are used to concentrate the electromagnetic field at the same radial depth of investigation, a considerable departure from the present invention of providing for different depths of investigation.

It is therefore the primary object of the present invention to provide new and improved method and apparatus for logging the resistivity of formations surrounding a borehole, at multiple depths of radial distance from such borehole;

It is also an object of the invention to provide such measurements at essentially fixed vertical depths;

It is also an object of the invention to provide substantially the same bed resolution for each such measurement;

It is also an object of the invention to provide a new and improved method and apparatus which provides multiple depths of investigation with a reduced number of antennas, thus providing a tool configuration which is shorter and more reliable;

It is also an object of the invention to utilize the geometric factor theory in logging formations surrounding an earth borehole using electromagnetic energy; and It is yet another object of the invention to provide for optimal operation under a variety of borehole conditions.

SUMMARY OF THE INVENTION

The objects of the invention are accomplished, generally, by the provision of a well logging apparatus adapted to be suspended in a drill string, wherein such apparatus includes a plurality of electromagnetic energy transmitters spaced along the longitudinal axis of the apparatus and a single pair of receivers spaced from the closest of the transmitters. As an additional feature of the invention, one receiver of the pair of receivers is spaced from the closest transmitter a predetermined distance which causes the depth of investigation of that transmitter to be essentially independent of formation resistivity.

An additional feature of the invention resides in means for sequentially pulsing the plurality of transmitters to thereby provide time separation between the bursts of electromagnetic energy emanating from the transmitters.

An important aspect of the invention resides in the provision of a method for measuring the resistivity of a formation surrounding an earth borehole comprising the steps of: generating electromagnetic energy at a first location on a well logging instrument suspended in said borehole; receiving electromagnetic energy from said formation at a second location on said well logging instrument, said first location being spaced from said second location a preselected distance which causes the depth of investigation of said instrument to be independent of the formation resistivity; and generating a log indicative of formation resistivity based upon said received electromagnetic energy.

An apparatus is also provided having a single transmitter spaced a predetermined distance from the receiver pair to cause the depth of investigation of such transmitter to be independent of formation resistivity.

BRIEF DESCRIPTION OF THE DRAWINGS

These and other objects, features and advantages of the present invention will be readily understood from a reading of the following specification, making reference to the drawings in which.

DETAILED DESCRIPTION OF THE INVENTION

Figure 1:
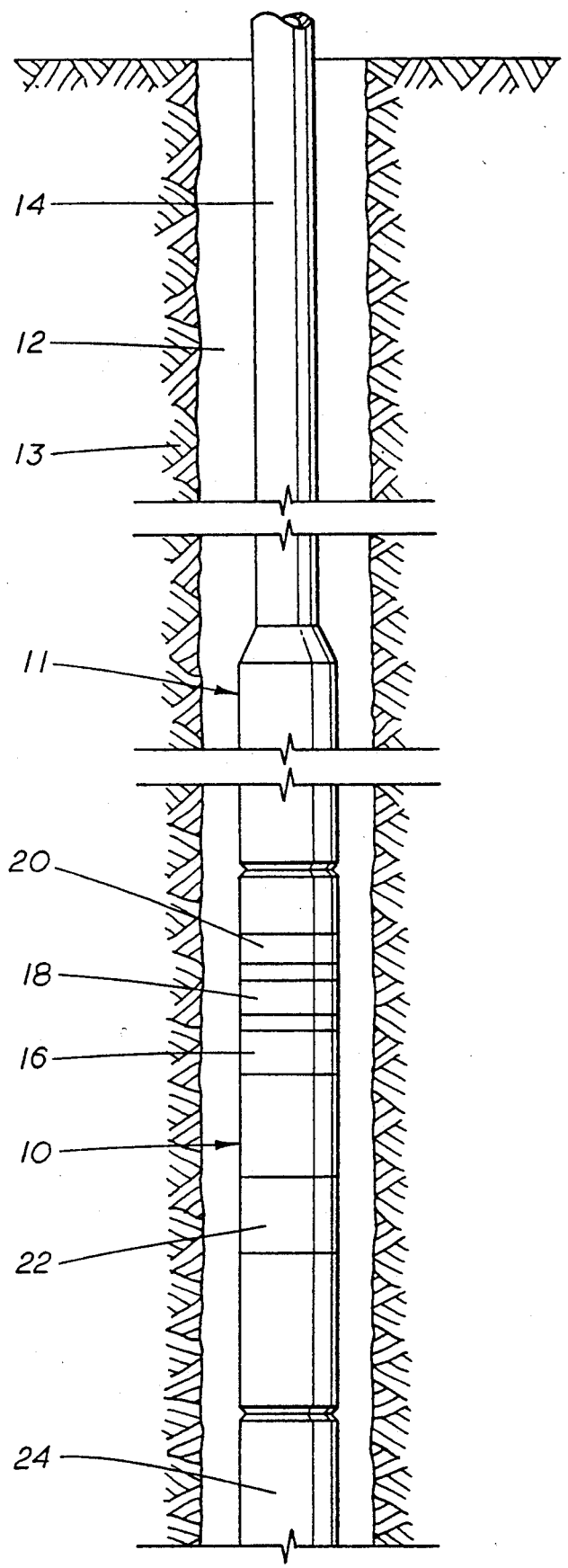
FIG. 1 is an elevated view of an MWD tool in accordance with the present invention which is suspended at an earth borehole as part of a drill string.

Referring now to FIG. 1, there is illustrated a logging tool 10 in accordance with the present invention suspended in an earth borehole 12 on a string of drill pipe 14 from the earth's surface, such drill string including one or more drill collars 11. A transmitter section comprised of transmitters 16, 18 and 20 are spaced along the length of the logging tool 10 from a receiver section 22 which includes a pair of receivers, sometimes referred to herein as $R_1$ and $R_2$. When using transmitter frequencies which are different, for example, 2 MHz and 1 MHz, one can, if desired, use a pair of coils in each receiver, one tuned to 2 MHz and one tuned to 1 MHz. Each pair of such coils in a receiver can, if desired, be laid side by side around the periphery of the tool 10, or can be concentrically stacked. The transmitters 16, 18 and 20, sometimes referred to herein as transmitters $T_1$, $T_2$ and $T_3$, respectively, are covered over with a non-conductive material as is well known in the prior art. Likewise, the receiver section 22 having receivers $R_1$ and $R_2$ is covered over with a non-conductive material. The transmitters and receivers can be fabricated in accordance with teachings of U.S. Pat. No. 4,940,943 assigned to the assignee of the present invention. It should be appreciated that the body of tool 10 is preferably made of steel in order to prevent the tool 10 from becoming a weak link in the drill string 14. Typically, and in a manner well known in the art, one or more drill collars 24 are threadably connected to a lower end of the logging tool 10 and into which a drill bit (not illustrated) is threadably connected.

It should be appreciated that the logging tool 10 also has the requisite electronic circuitry (illustrated in FIG. 2) for processing the signals received by the receiver section 22 in accordance with the present invention, thereby converting the received signals into a log or another indication of formation resistivity. It should also be appreciated that the processed signals can be recorded within the electronics section of the tool 10 or may be fed by a conventional telemetry system (not illustrated) to the surface for concurrent processing and readout at the surface. Typical of such a well known telemetry system is one which generates mud pulses which can be detected at the earth's surface and which are indicative of the processed signals.

Figure 2:
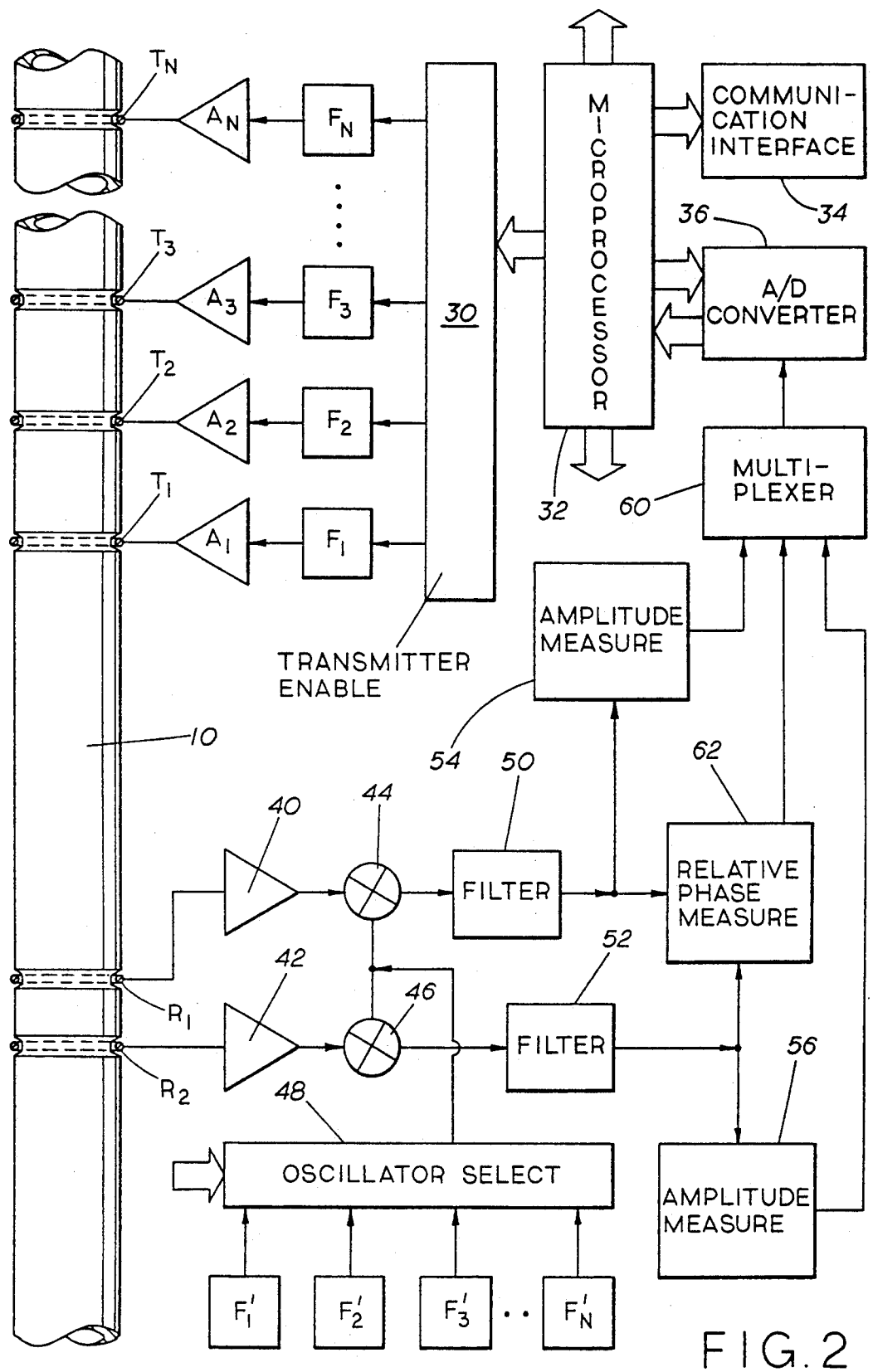
FIG. 2 is an elevated view of a well logging instrument in accordance with the present invention and showing in block diagram the circuitry used in actuating the transmitters and in processing the signals received at the single receiver pair.

Referring now to FIG. 2, the well logging instruments 10 is illustrated as having a plurality of transmitters $T_1, T_2, T_3 \ldots T_n$. While the preferred embodiment contemplates only three such transmitters ($T_1$-$T_3$), $T_n$ is illustrated for purposes of showing that additional transmitters can be used if desired. It should be appreciated that $T_1, T_2, T_3 \ldots T_n$ are successively further spaced from the receiver pair $R_1$ and $R_2$. The distance between the coils used for $R_1$ and $R_2$ is typically six inches along the longitudinal axis of the instrument 10. The distance the receiver pair and the successively spaced transmitters will vary in some applications as is discussed hereinafter in greater depth. Suffice it to say at this point that one typical configuration can show a distance between $T_1$ and $R_1/R_2$ of 12 inches/18 inches; the distance between $T_2$ and $R_1/R_2$ of 24 inches/30 inches; and a distance between $T_3$ and $R_1/R_2$ of 36 inches/42 inches, it being understood that the number "12/18", for example, indicates that the distance between $T_1$ and $R_1$ is 12 inches and that the distance between $T_1$ and $R_2$ is 18 inches, based upon $R_1$ and $R_2$ being six inches apart.

Coupled, respectively, to the transmitter coils $T_1, T_2, T_3 \ldots T_n$ are a plurality of amplifiers $A_1, A_2, A_3 \ldots A_n$. The plurality of amplifiers, in turn, are driven, respectively, by oscillators $F_1, F_2, F_3 \ldots F_n$. It should be appreciated that the frequency is preferably on the order of two MHz. Because of power attenuation at greater depths of investigation such as is the case with the longer spaced transmitters, it is preferable that the frequency $F_1 \geq F_2 \geq F_3 \geq \ldots F_n$. The preferred embodiment of the present invention contemplates that $F_1$ will be 2 MHz; $F_2$ will be 2 MHz; and $F_3$ will be 1 MHz. However, based upon various tests which have been conducted, the invention works quite well in the range of about 0.5 MHz up to about 4 MHz. The oscillators $F_1, F_2, F_3 \ldots F_n$ are controlled by the Transmitter Enable circuitry 30 which itself interfaces with a microprocessor 32, which in turn interfaces with a Communication Interface circuit 34 and an Analog to Digital Converter 36. The Communications Interface circuitry 34 is conventional and provides an interface between computers, an internal memory, mud pulser, the microprocessor and operators or computers at the earth's surface after the tool 10 is removed to the earth's surface.

The differential receiver pair $R_1$ and $R_2$ are respectively connected to amplifiers 40 and 42 which are connected, respectively, to mixer circuits 44 and 46.

A plurality of oscillators $F_1'$ and $F_2', F_3' \ldots F_n'$ are coupled through an Oscillator Select circuit 48 whose output is connected to the respective inputs of the mixer circuits 44 and 46. The Oscillator Select circuit 48 receives its inputs from the Microprocessor circuitry 32.

The respective outputs of the mixer circuitry 44 and 46 drive Low Pass Filters 50 and 52 whose outputs drive, respectively, the Amplitude Measurement circuits 54, 56 whose outputs are connected, respectively, to the Multiplexer circuit 60. The outputs of the Low Pass Filter circuits 50 and 52 are also connected to the inputs of the Relative Phase Measurement circuit 62.

In the operation of the device and the circuitry illustrated in FIG. 2, it should be appreciated that it is desirable to process intermediate frequency signals rather than the nominal 2 MHz signals received by the receiver pair $R_1$ and $R_2$. Accordingly, the oscillators $F_1'$, $F_2', F_3' \ldots F_n'$ are selected to be very near the corresponding frequencies $F_1, F_2, F_3 \ldots F_n$. For example, $F_n$ can be set at a frequency of 1.998 MHz and thus provide an intermediate frequency coming out of the mixer circuit 44 or circuit 46 of 0.002 MHz (2 KHz). In a similar fashion, $F_2'$ and $F_3'$ can be set at 1.998 MHz and 0.998 MHz, respectively. Thus, the only signals that pass to the low pass filters 50 and 52 will be the intermediate frequencies which are obtained by mixing the frequencies of $F_1, F_2, F_3 \ldots F_n$ with the frequencies $F_1'$, $F_2', F_3' \ldots F_n'$, respectively. It should be appreciated that the amplitude measurement circuit 54 provides a measure of amplitude of the signal received by $R_1$, whereas circuit 56 measures the amplitude of the incoming signals received by the receiver $R_2$. Similarly, the relative phase measurement circuit 62 provides an indication of phase difference between the signals received at receiver $R_1$ and the signals received at receiver $R_2$. As is well known in the art, the amplitude measurements and the relative phase measurements are both indicative of formation resistivity, which, through time multiplexing, provides any combination desired of the amplitude and phase measurements.

Figure 3:
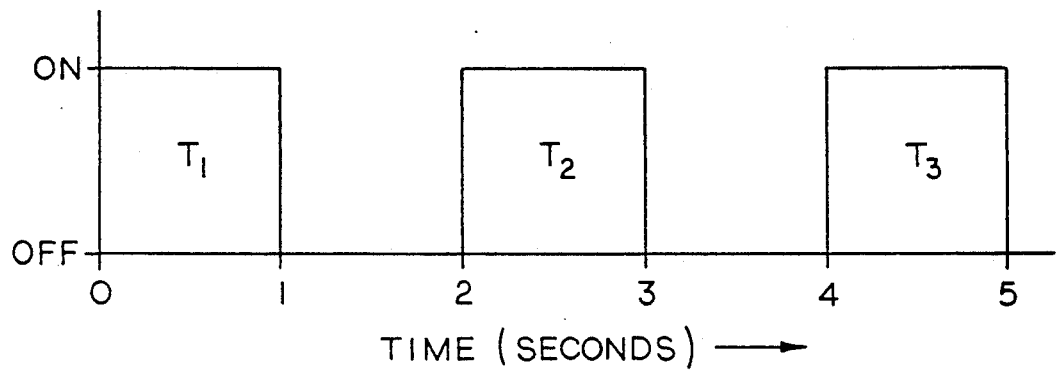
FIG. 3 is a pulse diagram illustrating the time sequence of transmitter pulsing.
Figure 4:
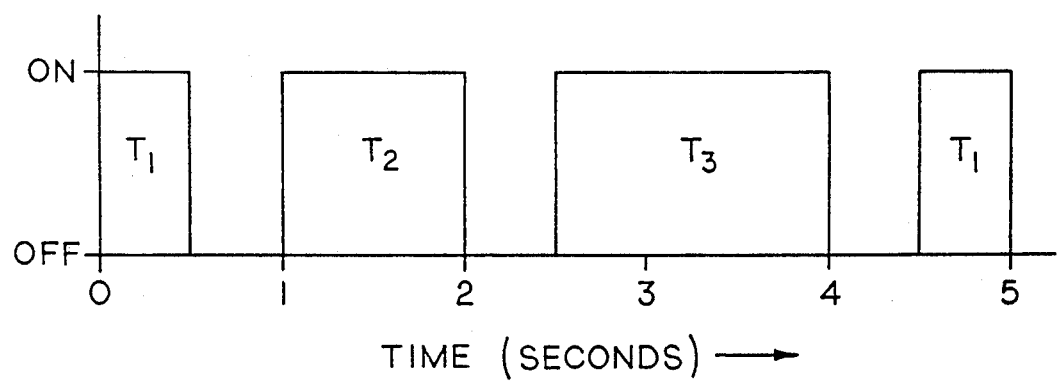
FIG. 4 is a pulse diagram illustrating a time sequence alternative to that illustrated in FIG. 3.

It should be appreciated that the frequencies $F_1, F_2, F_3 \ldots F_n$ could all be the same frequency except for the practical considerations of power loss in the formation due to the increased distance the signals have to travel through the formation. However, the conventional multiplexer circuitry used with this system enables time separation between the sequential pulsing of the transmitters $T_1, T_2, T_3 \ldots T_n$. For example, as illustrated in FIG. 3, transmitter $T_1$ can be pulsed for one second, followed by no pulse for one second, followed by the pulsation of transmitter $T_2$ for one second, followed by no pulse for one second, followed by a pulsing of transmitter $T_3$ for one second, etc., etc. Quite obviously, the duration of the pulsing for each transmitter can be varied, as well as the duration of no pulsing in between, for example, as illustrated in FIG. 4. It should be appreciated that the expression "time separation" between pulses includes the preferred embodiment of having one pulse commence immediately with the termination of the immediately preceding pulse. As desired, the duration of the pulses controlling $T_1$ may vary from the duration of the pulses for $T_2$ which may vary from the duration of the pulses for transmitter $T_3$ in order to provide a signature of the received pulses at receivers $R_1$ and $R_2$ to better identify the transmitters and thus the depth of investigation for the particular pulses being received. Thus, measurements are made to different depths into the formation by activating each transmitter at a different time such that only one transmitter is active at any one time and by recording or telemetering the received phase difference and/or amplitudes/(amplitude ratio) corresponding to each transmitted signal. Alternatively, the transmitters $T_1, T_2, T_3 \ldots T_n$ could all be operated at different frequencies and could be pulsed simultaneously, with the separation of signals being a function of frequency difference rather than establishing the difference by time separation in accordance with the preferred embodiment of this invention. However, and quite obviously, transmitting all of the transmitter signals simultaneously will usually result in the need for additional filters and processing circuitry to enable the instrument to properly discriminate between the different frequencies.

An important feature of the present invention is the attaining of an induction type of sensor response for the shallowest measurement, even though the sensor is operating at radio frequencies (around 2 MHz). This contravenes conventional wisdom in this area (see, e.g. Rodney, P. F. et al.: "The Electromagnetic Wave Resistivity MWD Tool", paper SPE 12167 presented at the 1983 SPE Annual Technical Conference and Exhibition, San Francisco, Oct. 5-8, 1983 and Dayev, D. S., *High-Frequency Electromagnetic Techniques of Well Logging*, "Nedra" Publishing House, Moscow (1974) 94-127, which would lead one to put the transmitter for the shallow spacing further from the receiver than is either necessary or desirable. The close proximity of the shallow transmitter to the receiver effectively puts the receiver within the induction zone of the shallow transmitter. Thus, propagation effects are largely negligible for the shallow receiver. This simplifies the borehole corrections which are needed for this sensor. Since it is extremely important that borehole corrections be properly applied to the shallow spaced measurements (since these are the most affected by the borehole), the approximate validity of geometric factor theory at this spacing is a definite advantage. Even more importantly, since the shallow measurement is in the induction zone, well established techniques for focusing the field of an induction sensor can be applied to the shallow measurement in order to minimize the influence of the borehole while still obtaining a shallow measurement in the formation (see, e.g., *Fundamentals of Formation Evaluation*, Donald P. Helander, OGCI Publications, Oil and Gas Consultants International, Inc., Tulsa, 1983, P. 110).

It has been fairly well established that there is a geometrical limit to the depth of investigation of an electromagnetic energy resistivity sensor given (diametrically) by the sum of the spacings of the near and far antennas from the transmitter. This applies to phase difference based measurements; amplitude based measurements are about 50% deeper. However, these are all rules of thumb. It has been established that the depth of investigation is a function of the formation, borehole and invaded zone resistivities and only approaches this limit at high mud and formation resistivities. In a borehole with 0.03 ohm meter mud, the skin depth is 2.43" at 2 MHz. Generally, under this condition, one would expect the actual investigation depth to fall far short of the maximum investigation depth. However, quite unexpectedly, we have found this to depend on the placement of the receiver antennas: the closer the receiver antennas are to the transmitter, the better their depth of investigation approximates the ideal value under all conditions. For example, the depth of investigation of a 24"/30" receiver pair under these conditions is about 22 inches: following conventional wisdom, one would expect a 9"/15" sensor to have a depth of investigation of $$22/54 \times 24 = 9\tfrac{7}{9}"$$

where 22 is indicative of the 22 inch depth of investigation for the 24"/30" sensor, the 54 comes from 24"+30", the maximum depth of investigation of the 24"/30" sensor and 24 comes from 9"/15" sensor. The actual depth of investigation was calculated to be 20" for the 9"/15" sensor; this was verified experimentally. The results are even more striking with a 6"/12" antenna spacing. Thus, as the receivers approach the transmitter, the investigation depth approaches the ideal investigation depth. In summary, we have determined that the preferred spacing between the closest transmitter and the closer receiver is 6"-12". The preferred range of spacing from the closest transmitter to the further receive is 12"-18", preferably maintaining the 6" separation between receivers.

This can be understood theoretically as follows. The fields of an induction or propagating wave sensor are fairly well approximated by the fields of a magnetic dipole. The field of an oscillating magnetic dipole with its moment oriented along the z-axis is well known, as is given by: (*Electromagnetic Theory* by Julius Adams Stratton, McGraw-Hill Book Company, New York, 1941, P. 437.)

Note that when the product of the wave number and the distance from the near transmitter is small, the static and induction terms tend to dominate over the radiation term. In other words, the sensor tends to behave like an induction sensor. It is for this reason that induction type response is observed when the transmitter is very close to the receivers: the radiation term is insignificant. Although this might appear simple in retrospect, it was by no means obvious until we had actually built a sensor with a 12"/18" spacing of the receiver pair from the transmitter. This sensor read far deeper into the formation than we anticipated.

For this reason, one is forced to set the transmitter for the shallow measurements much closer to the receivers than would be expected, but one also obtains a 2 MHz measurement to which geometric factor theory can be applied (at least in approximation). This is a great advantage for it simplifies the borehole correction function and makes it possible to make accurate corrections for borehole effects. Note, however, in large diameter boreholes that the outer reaches of the borehole and the formation are again in the radiation zone so that geometric factor theory cannot be applied in large diameter boreholes. Nevertheless, for normal sized boreholes, the fact that the measurement is made in the induction zone means that methods traditionally used to focus an induction signal can be applied to the shallow measurement if desired in order to minimize borehole effects. As described in Helander, cited above, this focusing is typically accomplished in the prior art only by adding two to four additional antennas with currents directed opposite to that of the main transmitting antenna.

Thus, we have discovered that with proper placement of the shallowest transmitter, an induction-like response is obtained. Therefore, geometric factor theory can be applied to the shallowest measurement. This is of great advantage since the shallowest measurement, by its nature is the most affected by borehole conditions. The applicability of geometric factor theory implies that focusing techniques traditionally practiced at 20

KHz (a frequency two orders of magnitude lower than that of the present device) can be used to focus the shallow sensor and nearly eliminate borehole effects.

It is important to understand that if the instrument follows the geometric factor, the depth of investigation is essentially independent resistivity. This means, quite unexpectedly, that spacing uniquely defines depth. Application of this finding includes the following methods, where $L_1$ is the spacing between $T_1$ and $R_2$, and $L_2$ is the spacing between $T_1$ and $R_2$:

(1) $L_1$ designed to be $R_{borehole} + 1''$ allows the majority of the signal to be reflective of the resistivity of a 1" annulus around the borehole. This virtually assures an $Rx_o$ measurement. Clearly, $L_1$ would be different for different size boreholes, and hence, tools.

| Tool Size | Diameter of Boreholes | $L_1$ Desired |
|---|---|---|
| 6¾ | 8½ | 5½ |
| | 9¾ | 6½ |
| 8 | 9¾ | 6½ |
| | 12¼ | 7½ |
| 8 | 14⅜ | 8½ |
| 9½ | 14⅜ | 8½ |
| | 17½ | 10 |

(2) If $L_1$ is shallow enough, differences between readings taken using the shallow sensor and those taken using deeper sensors could provide an estimate of shale hydration. This in turn is indicative of swelling and subsequent spalling (in some instances). Time lapse logging will show progression of these events, especially in conjunction with density measurements. In another application: if the shale is known not to be filtrate laden, density can be used as pore pressure indicates. Also, a good $Rx_o$ can be used to estimate porosity. If $R_w$ is known from a clear water sand $$Sw = \sqrt{\frac{F \cdot R_w}{R_7}}$$

where $S_w$ is water saturation, F is formation factor, M is the Archie exponent, and $R_{mf}$ is the resistivity of the mud filtration.

In a fully flushed zone, $$Sw = 1, R_t = Rx_o$$
$$\therefore F = \frac{Rx_o}{R_{mf}} \text{ and } Fa\phi^{-m}$$

The object of a multiple depth resistivity tool, typically, is to obtain resistivities of three or more depths of investigation to identify the invasion profile. Since a depth is generally defined as the distance at which 50% of the signal is obtained, significantly different depths are needed in order to be useful. In a resistive oil bearing formation we have:

| (Depth of investigation approximate inches) | | |
|---|---|---|
| 12"/18" | 24"/30" | 36"/42" |
| 25 | 50 | 73 |

This is a good spread and is amenable to invasion modeling. However, the most likely value of such a tool will be in assessing invasion in water zones. This is because in most instances the water zone below the oil contact is much more likely to be invaded than this oil zone and yet both will have similar permeability. A typical water zone will have resistivities in the vicinity of 0.2 ohm meters.

In developing this project, we had a surprising finding that the 12"/18" spacing reads a depth too close to the 24"/30" spacing in conductive formations. Also, ideally, one should want the shallow measurement to see $Rx_0$, and so a 24" depth is too great. Consequently, this finding drives out a tool design requiring a closer short spacing. A spacing too short will increase the borehole corrections especially in saline muds, so the preferred short spacing tools is somewhere between a 6"/12" and a 12"/18". Of course, the distance between the two receivers may also be adjusted from the preferred six inches shown without adversely impacting the logic. The borehole corrections mentioned above will be more significant at the higher resistivities, where the depth of investigation differences are acceptable even at 12"/18". In order to minimize these corrections, conventional wisdom would have persuaded us to use a short spacing of between 12"/18" and say 20"/26" (expecting depths of range of 13 to 21 inches). The new finding forces us to shorter spacings in a non-obvious fashion.

An additional advantage to the present invention is achieved by using a single pair of receiving antennas. The stability (mechanical, thermal and electrical) of the receiver electronics is far more important than the stability of the transmitter (which can result in a change of power level or a modest change in operating frequency). A sub can be configured with a plurality of transmitters, more than are actually needed for a specific application with little extra cost. The transmitters needed for a specific application can be selected, e.g., by rotating the transmitter insert into a number of pre-set configurations which link the oscillators with the appropriate transmitting antennas. This provides a sensor that requires minimal power consumption and can be used both in large diameter boreholes (where one might find it necessary to choose a rather large diameter of investigation for the shallowest reading) and small diameter boreholes (where it may be necessary to select a transmitting antenna extremely close to the receivers in order to make measurements in the flushed or invaded zones of the formation). The invention extends broadly to the concept of selectably moving the transmitter position to suit the application, one embodiment being the rotation of the insert.

Moreover, although the preferred embodiment contemplates the use of a plurality of sequentially spaced transmitters, the invention is also inclusive of using a single electromagnetic energy transmitter operating in a frequency range of about 0.5 MHz–4.0 MHz in conjunction with a single pair of receivers spaced in the range of 6"/12"–12"/18" from such single transmitter.

What is claimed:

1. An apparatus for measuring formation resistivity about a borehole traversing an earth formation, comprising:
   a tubular housing means having a longitudinal axis therethrough and threaded at each end for threaded engagement in a drill string about the drill bit;
   means for transmitting electromagnetic energy into the formation surrounding said housing means, said transmitting means including a plurality of electromagnetic energy transmitters each having an output frequency in the range of 0.5-4.0 MHz, sequentially disposed about the exterior of said housing means along the length of said longitudinal axis, said plurality of transmitters including first and second transmitters having a first, common output frequency and a third transmitter having a second output frequency different from said first output frequency;

means for receiving electromagnetic energy from said formation, said receiving means including only a single pair of receivers sequentially disposed about the exterior of said housing means along the length of said longitudinal axis, the first of said plurality of transmitters being spaced a predetermined distance from the first of said pair of receivers, and said second and third transmitters being sequentially spaced further along said longitudinal axis from said first receiver than said first transmitter is spaced from said first receiver; and means for converting said received electromagnetic energy into a log of formation resistivity having different radial depths of investigation from said borehole.

2. The apparatus according to claim 1, wherein the spacing between said first transmitter and the first of said receivers is approximately 6-12 inches.

3. The apparatus according to claim 2, wherein the spacing between said first transmitter and the second of said receivers is approximately 12-18 inches.

4. The apparatus according to claim 3, wherein the spacing between said second transmitter and the first of said receivers is approximately 24 inches.

5. The apparatus according to claim 4, wherein the spacing between said second transmitter and the second of said receivers is approximately 30 inches.

6. The apparatus according to claim 1, wherein the output frequency of the first and second transmitters is 2.0 MHz and the output frequency of the third transmitter is 1.0 MHz.

7. An apparatus for measuring formation resistivity about a borehole traversing an earth formation, comprising:

a tubular housing means having a longitudinal axis therethrough and threaded at each end for threaded engagement in a drill string about the drill bit;

means for transmitting electromagnetic energy into the formation surrounding said housing means, said transmitting means including a plurality of electromagnetic energy transmitters each having an output frequency in the range of 0.5-4.0 MHz, sequentially disposed about the exterior of said housing means along the length of said longitudinal axis, said plurality of transmitters including at least two transmitters having a first common output frequency and at least one additional transmitter having a second output frequency different from said first output frequency;

means for receiving electromagnetic energy from said formation, said receiving means including first and second receivers sequentially disposed about the exterior of said housing means along the length of said longitudinal axis, the closest of said transmitters being spaced a predetermined distance from the first said receiver, and each of the other said transmitters being sequentially spaced further along said longitudinal axis from said first receiver than said closest transmitter is spaced from said first receiver; and means for converting said received electromagnetic energy into a log of formation resistivity having different radial depths of investigation from said borehole.

8. The apparatus according to claim 7, wherein said second output frequency is lower than said first output frequency.

* * * * *